(12) United States Patent
Wyland

(10) Patent No.: US 6,931,466 B2
(45) Date of Patent: Aug. 16, 2005

(54) REPROGRAMMABLE INPUT-OUTPUT PINS FOR FORMING DIFFERENT CHIP OR BOARD INTERFACES

(75) Inventor: David C. Wyland, Morgan Hill, CA (US)

(73) Assignee: Cradle Technologies, Inc., Sunnyvale, CA (US)

(*) Notice: Subject to any disclaimer, the term of this patent is extended or adjusted under 35 U.S.C. 154(b) by 881 days.

(21) Appl. No.: 09/968,581

(22) Filed: Sep. 28, 2001

(65) Prior Publication Data

US 2003/0065863 A1 Apr. 3, 2003

(51) Int. Cl.[7] .......................... G06F 13/00; G06F 13/14
(52) U.S. Cl. .......................... 710/100; 710/305; 710/3
(58) Field of Search .............................. 710/1, 3, 5, 36, 710/100, 305, 315

(56) References Cited

U.S. PATENT DOCUMENTS

| | | | |
|---|---|---|---|
| 5,440,755 A | 8/1995 | Harwer et al. | 395/800 |
| 5,951,667 A | 9/1999 | Abramson | 710/129 |
| 5,954,802 A | 9/1999 | Griffith | 710/22 |
| 5,968,144 A | 10/1999 | Walker et al. | 710/28 |
| 6,012,116 A * | 1/2000 | Aybay et al. | 710/113 |
| 6,311,245 B1 * | 10/2001 | Klein | 710/306 |
| 6,687,775 B1 * | 2/2004 | Bassett | 710/62 |

* cited by examiner

*Primary Examiner*—Jeffrey Gaffin
*Assistant Examiner*—David E. Martinez
(74) *Attorney, Agent, or Firm*—Schneck & Schneck; Thomas Schneck; Mark Protsik

(57) ABSTRACT

Disclosed is a reprogrammable I/O system for a chip or board system that can be reprogrammed to simulate many I/O interfaces in firmware. The reprogrammable I/O system comprises an I/O cluster, an I/O bus, I/O pins, and logic at the I/O pins. The I/O pins are arranged logically in a row and are grouped into pin groups of eight pins. Each pin group also includes a pin state machine (PSM) and a data FIFO coupled together. Each PSM has chain connections to the two neighboring PSM's. Each data FIFO has chain connections to the two neighbor data FIFO's. The reprogrammable I/O system allows firmware to organize the I/O pins into I/O interfaces. The firmware in PSM's and the I/O cluster that control the operations of the I/O pins can be changed (reprogrammed) so that the I/O system can perform other different interfaces.

20 Claims, 8 Drawing Sheets

| Group | Pine | Device | Signals | Description |
|---|---|---|---|---|
| 0 | 3 | SDRAM | Control | Command: WE#, CAS#, RAS# |
| | 2 | | Control | Bank |
| | 3 | | Control | Clock Enable |
| 1 | 4 | | Control | Chip Selects |
| | 4 | | Address | Address 0-3 |
| 2 | 8 | | Address | Address 4-11 |
| 3 | 8 | | Data | Write Enables |
| 4-11 | 64 | | Data | Data 0-63 |
| 12 | 8 | 1394 | Control | |
| 13 | 4 | | Data | |
| | 4 | | GPIO | CCD 1 bits 0-3 |
| 14 | 4 | CCD in | Control | Hsync, Vsync, Field, Clock |
| | 4 | | Data | CCD 0 bits 0-3 |
| 15 | 6 | | Data | CCD 0 bits 4-9 |
| | 2 | | GPIO | |
| 16 | 8 | | Data | CCD 1 bits 0-7 |
| 17 | 4 | | Data | CCD 1 bits 8-11 |
| | 1 | DENC | Control | Video Clock |
| | 3 | | GPIO | A0, DTACK + 1 for uP interface |
| 18 | 8 | | Data | |
| 19 | 8 | PCI | Control | Arbiter: 4 request in 4 grant out |
| 20 | 7 | | Control | FRAME, IRDY, TRDY, DEVSEL, IDSEL, STOP, PAR |
| | 1 | | GPIO | |
| 21 | 4 | | Control | C/BE |
| | 4 | | GIPO | |
| 22-25 | 32 | | Data | AD 0-31 |
| 26 | 4 | M LCD | Control | |
| | 4 | | Data | Data 0-3 |
| 27 | 8 | | Data | Data 4-11 |
| 28 | 4 | | Data | Data 12-15 |
| | 4 | M LCD | Control | |
| 29-30 | 16 | | Data | Data 0-15 |
| 31 | 8 | | GPIO | ADAC interface |
| | 256 | | | Total Pins Allocated |

FIG. 9

REPROGRAMMABLE INPUT-OUTPUT PINS FOR FORMING DIFFERENT CHIP OR BOARD INTERFACES

TECHNICAL FIELD

The present invention relates to reprogrammable input/output (I/O) pins for micro computers and an associated method of building the same, and more particularly to a microcomputer system that can be reprogrammed to interface with a variety of external I/O devices and buses such as external DMA devices and PCI, ISA buses.

BACKGROUND ART

I/O pins of a microcomputer system once configured and designated for interfacing with an external I/O device or bus usually cannot be reconfigured for interfacing with another external I/O device or bus. For example, if some I/O pins of a chip or board are configured and designated for interfacing with a PCI bus, these I/O pins cannot be reconfigured for interfacing with an ISA bus.

For instance, the UPI-452 CHMOS programmable I/O processor by Intel is a general-purpose slave I/O processor that allows the designer to grow a customized interface solution. However, the level of programming flexibility is low. For example, Port 1 (A0–A7) of the UPI-452 processor is an 8-bit quasi-bi-directional I/O port. Port 1's alternate functions can be activated only if the corresponding bit latch in another port SFR contains a one. Although the pins of port 1 can be programmed to have alternate functions, these functions are limited. In other words, the eight pins of port 1 cannot be reprogrammed to have other functions other than the listed functions they have been designed to handle.

Therefore, it is an object of this present invention to provide a chip/board with I/O pins that can be reprogrammed to perform varied functions.

SUMMARY OF THE INVENTION

The chip or board of the present invention achieves the stated object by using a reprogrammable I/O system that allows simulation of most I/O devices and buses in software which is made resident in firmware which configures output pins. The reprogrammable I/O system comprises an I/O cluster, an I/O bus, I/O pins, and logic at the I/O pins. The I/O pins are arranged logically in a row and are grouped into pin groups of eight pins. Each pin group also includes a pin state machine (PSM) and a data FIFO coupled together. Each PSM has chain connections to the two neighboring PSM's. Each data FIFO has chain connections to the two neighbor data FIFO's. The reprogrammable I/O system allows software to organize the I/O pins into I/O interfaces. An I/O interface is a set of pins and a communication protocol that allows the chip or board to communicate with an external I/O device or bus. Because the PSM's are chained together, they can communicate via the chain connections to control the operations of I/O pins of more than one pin group. Similarly, because the data FIFO's of the pin groups are chained together, they can implement a data bus of an interface that requires a number of I/O pins more than a pin group can provide. The firmware in PSM's and the I/O cluster that control the operations of the I/O pins can be changed (reprogrammed) so that the I/O system can perform other different interfaces.

BRIEF DESCRIPTION OF THE DRAWINGS

FIG. 9 is a table of pin group assignments for the I/O interfaces when the system of FIG. 1 is used in a digital camcorder.

BEST MODE FOR CARRYING OUT THE INVENTION

Figure 1:
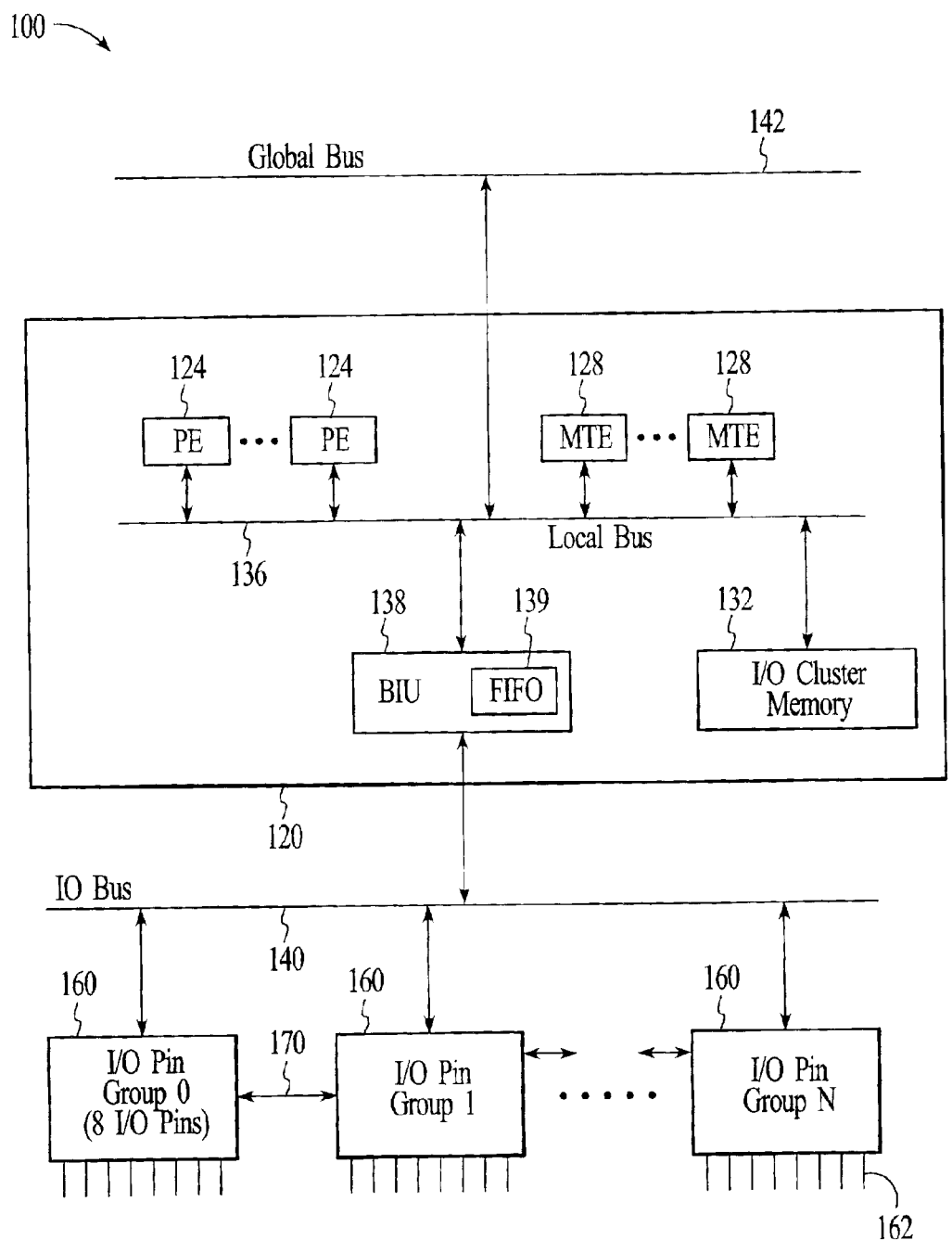
FIG. 1 is an electrical schematic diagram of the programmable I/O system of the present invention.

With reference to FIG. 1, the reprogrammable I/O system 100 of the present invention comprises an I/O cluster 120, an I/O bus 140, and a plurality of I/O pin groups 160 (or pin groups). I/O Cluster 120 and other regular clusters, not shown, form an integrated circuit (or chip) called a Universal Micro System (UMS). All the clusters have an interface to a Global Bus 142. In a first preferred embodiment, each pin group has eight I/O pins 162 (or pins). Each I/O pin group 160 has chain connections 170 to the pin group 160 next to it. Each I/O pin group 160 contains logic for low speed programmed I/O (PIO) transfers and for high speed direct memory access (DMA) I/O block transfers. Each I/O pin 162 can be reprogrammed as a low speed, general purpose programmed I/O pin (GPIO) or as a high speed DMA I/O pin. GPIO is the concept of driving (read/write) every pin directly by a processing engine (PE) 124. At hardware reset, all I/O pins 162 are configured as programmed I/O pins. I/O cluster 120 communicate with I/O pin groups 160 through I/O bus 140.

In the first preferred embodiment, I/O cluster 120 comprises a plurality of processing elements 124, a plurality of memory transfer engines 128, a cluster memory 132, and a bus interface unit (BIU) 138. These components communicate with one another through a local bus 136. In a second preferred embodiment, I/O cluster 120 may have more than one bus interface unit 138. Bus interface units 138 provides firmware control of high speed DMA I/O interfaces coupling reprogrammable I/O system 100 to external high speed DMA I/O devices and buses. Memory transfer engines 128 are capable of moving a block of byte data between external I/O devices and buses and memory including system memory SDRAM (not shown) and I/O cluster memory 132.

Bus interface unit 138 is used for low speed, programmed I/O transfers where processing element 124 accesses I/O pins 162 directly, and for high speed DMA block transfers as controlled by DMA logic 260, seen in (FIG. 2) in the corresponding I/O pin group 160. Returning to FIG. 1, bus interface unit 138 has a FIFO buffer 139 to buffer data for DMA I/O transfers, and a memory transfer engine 128 reads or writes the data via local bus 136 when the data is available. All I/O transfers are initiated from I/O cluster 120. There are two types of I/O interfaces: programmed I/O (PIO) interfaces and DMA I/O interfaces.

I/O bus 140 allows processing elements 124 of I/O cluster 120 to communicate directly with I/O pins 162. For low to medium speed external devices and buses, such as RS-232 and ISA bus, processing elements 124 using I/O bus 140 can provide all the necessary logic and timing for the corresponding programmed I/O interfaces by directly driving the corresponding I/O pins 162 under program control. The programmed I/O interfaces are totally defined by software, and is therefore completely flexible. Programmed I/O control is effective and practical for I/O devices that have transfer and decision times greater than approximately 100 instruction cycles. For a processing element 124 with an instruction rate of approximately 100 MIPs, this allows a programmed I/O interface to a device that operates up to a 1 MHz transfer rate.

Figure 2:
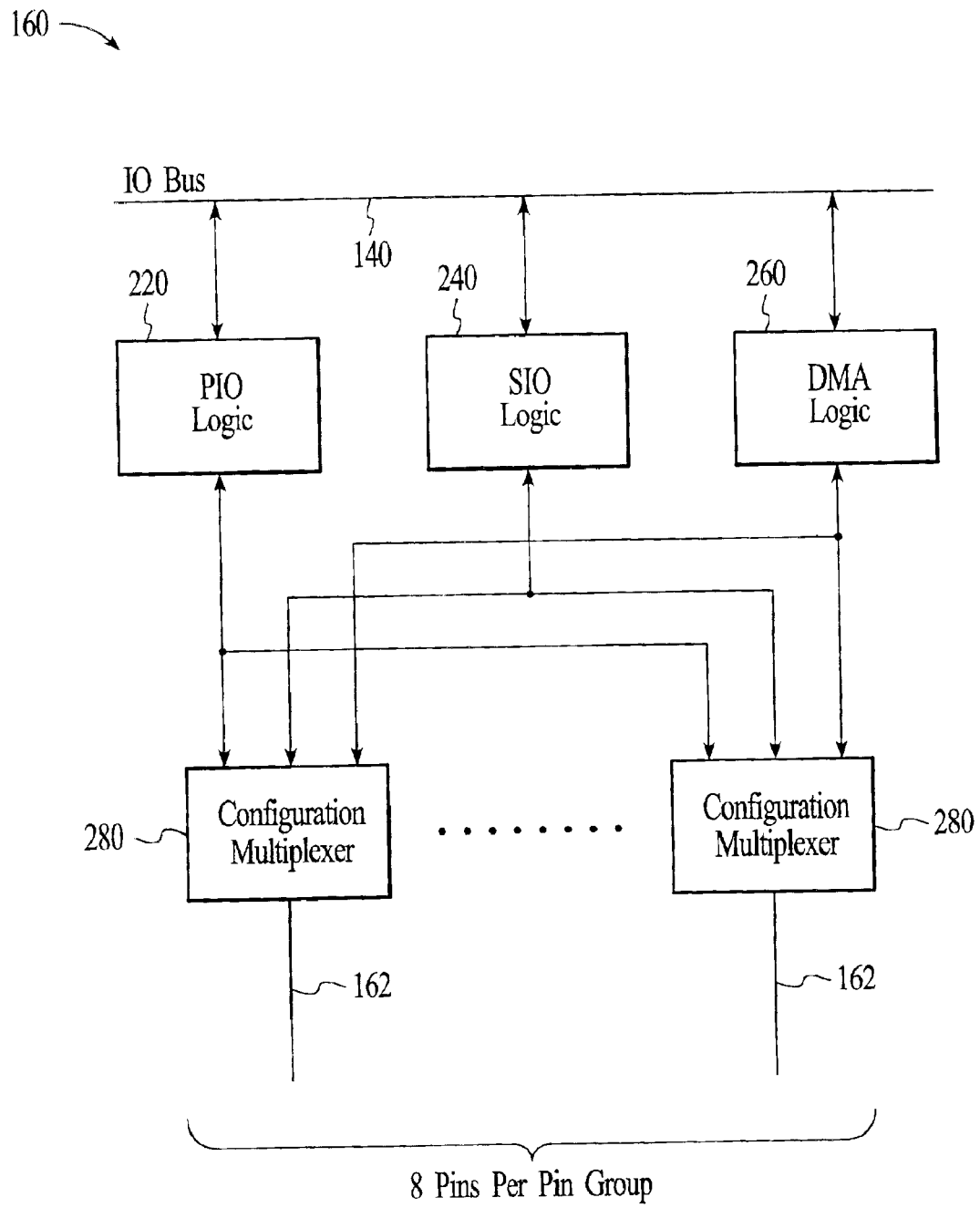
FIG. 2 is an electrical schematic diagram of an I/O pin group of the programmable I/O system in FIG. 1.

With reference to FIG. 2, each I/O pin group 160 comprises an programmed I/O (PIO) logic 220, a serial I/O (SIO) logic 240, and a DMA logic 260. If an I/O pin 162 is to be configured as a DMA I/O pin, its corresponding configuration multiplexer 280 is configured to select DMA logic 260.

PIO logic 220 allows processing element 124, seen in FIG. 1, to read and write to the PIO pins 162. PIO logic 220 consists of a data output flip-flop, an output enable flip-flop, and a read flip-flop per pin, not shown. These flip-flops can be read and written by processing element 124 through I/O bus 140, seen in FIG. 1. If an I/O pin 162 is configured as a PIO pin, the PIO data and output enable flip-flops drive the pin.

Serial I/O (SIO) logic 240 provides a medium speed, i.e. to 100 Mbit/sec, serial I/O capability for pin group 160. SIO logic 240 can be used for serial data transfers. For example, the serial control information is required in 1394 PHY devices and the MII interface of Ethernet MAC (media access control) devices. SIO logic 240 can also be used for serial I/O interfaces such as JTAG and 3-wire industrial buses.

Reprogrammable I/O system 100 of the present invention allows software to organize I/O pins 162 into I/O interfaces. An I/O interface is a set of I/O pins 162 with a communication protocol that allows reprogrammable I/O system 100 to communicate with an external I/O device or bus through the set of I/O pins. For reprogrammable I/O system 100, the I/O interface communication protocol is in software.

Figure 3:
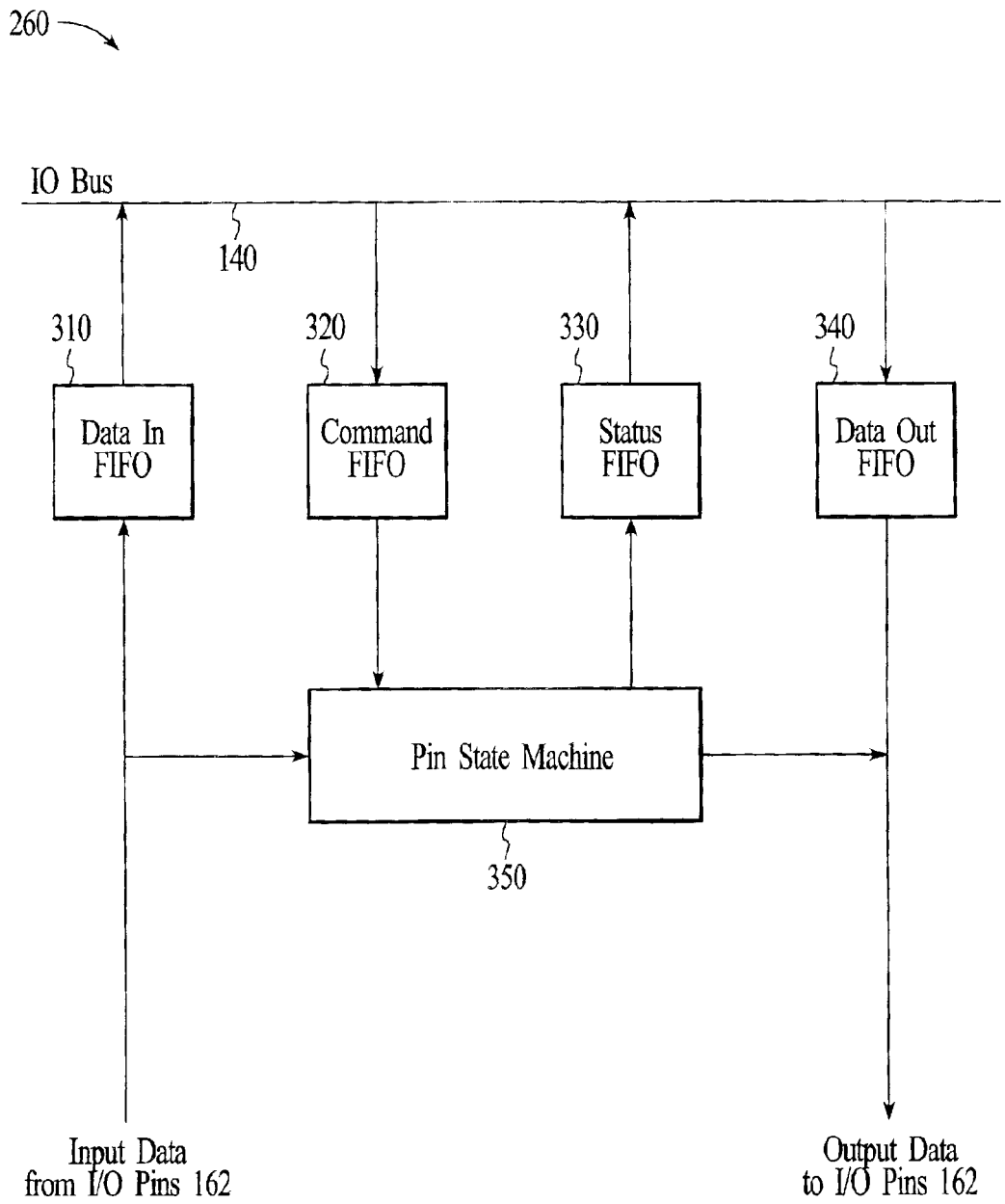
FIG. 3 is an electrical schematic diagram of the DMA logic of the I/O pin group in FIG. 2.

With reference to FIG. 3, DMA logic 260 of a pin group 160 consists of a Pin State Machine 350, a Data In first-in-first-out buffer (FIFO) 310, a Data Out FIFO 340, a Command FIFO 320, and a Status FIFO 330. DMA logic 260 provides hardware for automatic block transfer of data between DMA I/O pins 162 (i.e., pins that are programmed as DMA I/O pins) and cluster memory 132 (FIG. 1) and system SDRAM (not shown).

DMA logic 260 moves data between I/O pins 162 and memory, specifically cluster memory 132 in FIG. 1 or SDRAM, through Data In FIFO 310 and Data Out FIFO 340. Pin State Machine 350 controls the movement of data between I/O pins 162 and Data FIFOs 310 and 340. Pin State Machine 350 communicates with processing element 124 or memory transfer engine 128, seen in FIG. 1 through Command and Status FIFOs 320 and 330. Pin State Machine 350 receives commands from the Command FIFO 320, and it sends status updates to the Status FIFO 330.

Data In and Data Out FIFOs 310 and 340 have serial to parallel and parallel-to-serial logic, respectively, not shown. This allows DMA logic 260 to accept and supply data in widths of 1, 2, 4 or 8 bits wide under the control of Pin State Machine 350. For example, 1394 devices move data in units of 2, 4, or 8-bits depending on the speed code of the packet.

Figure 8:
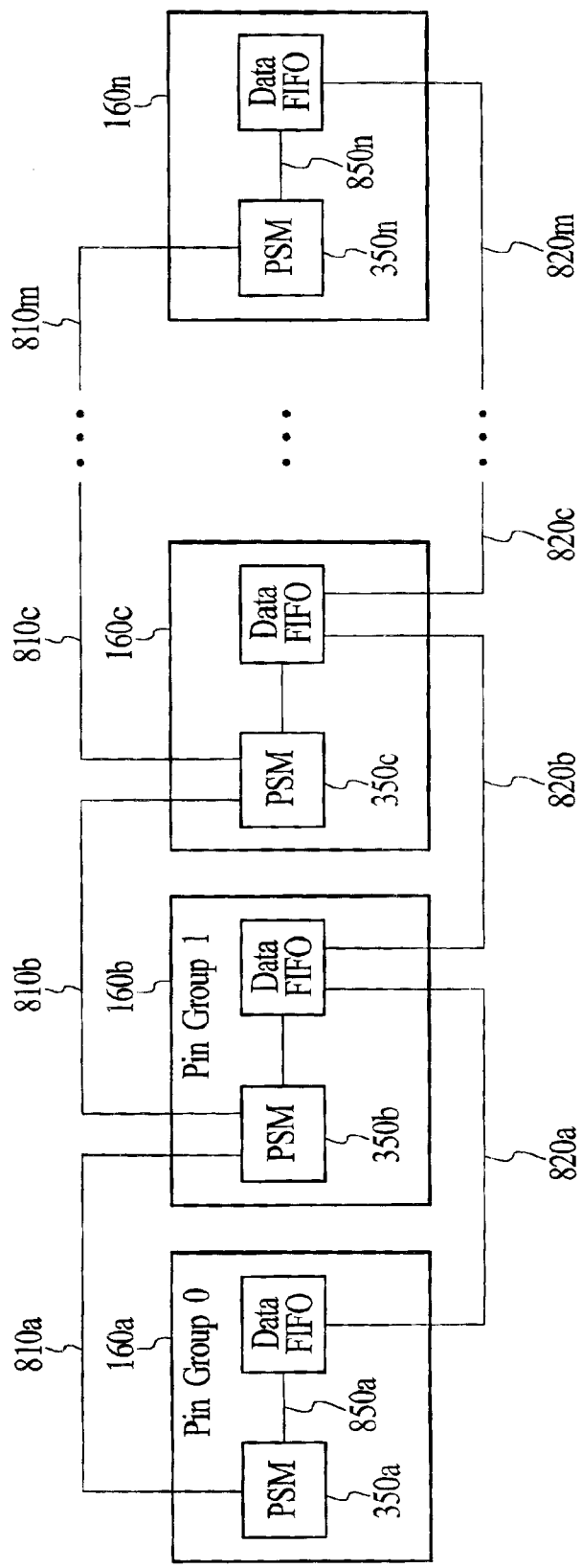
FIG. 8 is a electrical schematic diagram of the I/O pin groups of the system of FIG. 1 showing the interconnections between the pin groups.

Pin State Machine 350 provides sequence, handshake, and timing control for the DMA transfers. It decodes commands from memory transfer engine 128 (FIG. 1). Pin State Machine 350 consists of a programmable logic device (PLD), not shown having configuration multiplexers at its inputs and logic at its outputs. The PLD decodes the current state in a 5-bit State register, not shown, and uses the signals at its inputs to generate the next state. The PLD decodes the state bits and other inputs to generate the outputs, including generating the next state. Each Pin State Machine 350 has chain connections 810, seen in FIG. 8, to the two neighbor Pin State Machines 350 of the two neighbor pin groups 160. The PLD is a programmable logic array (PLA) with an AND and OR array with the bits in the AND and OR arrays that must be configured.

In summary, the invention relates to the arrangement of I/O pins into pin groups, the assignment of I/O pins to different interfaces, and the interconnect between the Pin State Machines 350 so that these Pin State Machines 350 can cooperate in controlling the operation of the I/O pins so as to implement the different interfaces. The internal structure of Pin State Machines 350 is any logic arrangement which produces the desired pin arrangement.

With reference again to FIGS. 1 and 3, reprogrammable I/O system 100 has two types of I/O interfaces: programmed I/O interfaces and DMA I/O interfaces. Transfers through programmed I/O interfaces are initiated by software in a processing element 124 by directly reading and writing data to the programmed I/O pins 162. This is sometimes called "bit banging." All data transfers, control, and timing are performed by the software in the processing element 124.

DMA I/O interfaces are block transfer interfaces. DMA I/O interfaces use programmable Pin State Machines 350 to transfer data between I/O pins 162 and data FIFOs 310 and 340. Data FIFOs 310 and 340 buffer the data for transfer to Cluster memory 132 or system SDRAM (not shown). A DMA I/O interface consists of a memory transfer engine 128 that may be shared by other DMA I/O interfaces, a Pin State Machine 350, and a set of I/O pins 162 divided into three types: data I/O pins 162, control I/O pins 162, and optional address I/O pins 162. The set of I/O pins 162 define the I/O signals of a DMA I/O interface, and firmware in the memory transfer engine 128 and Pin State Machine 350 define the registers and dynamic behavior of the DMA I/O interface. The firmware provides the sequence control to provide the data transfers of the DMA I/O interface. The firmware duties of the DMA I/O interface are shared between memory transfer engine 128 and Pin State Machine 350. Pin State Machine 350 receives and executes commands from memory transfer engine 128, and Pin State Machine 350 provides completion and error status back to memory transfer engine 128. Pin State Machine 350 may process simple or complex commands depending on how the logic is shared between memory transfer engine 128 and Pin State Machine 350. In the simplest case, memory transfer engine 128 issues one command for each I/O clock cycle, such as to read or write one byte of data, while memory transfer engine 128 does the work of assembling the bytes into packets and transmitting them. In the complex case, memory transfer engine 128 may issue a single command to read or write a block of data, and Pin State Machine 350 does the work of assembling the bytes into packets and transmitting them. The tradeoff between firmware complexity in memory transfer engine 128 and Pin State Machine 350 is part of the design of the firmware design of an DMA I/O interface. Reprogrammable I/O system 100 creates virtual I/O devices in firmware residing in memory transfer engine 128. These virtual I/O devices appear to UMS as hardware I/O device controllers with registers and/or memory that are mapped into the system address space. A DMA I/O interface such as a VGA controller appears to have hardware registers, and the controller takes action when data is written to these registers. A RAM device appears as RAM to the Universal Micro System (UMS). The difference between a DMA I/O interface and a hardware I/O controller is how the transfer command is interpreted after it is issued. In a hardware I/O controller, the system bus interface hardware, not shown, interprets the command and transfers data using hardwired logic. In a DMA I/O interface, firmware in a processing element 124 or memory transfer engine 128 interprets the command and executes it in conjunction with Pin State Machine 350.

DMA I/O interfaces appear to UMS as hardware I/O controllers with DMA capability, such as VGA and disk controllers. The UMS uses these DMA I/O interfaces by writing information to the associated virtual hardware registers. In a hardwired DMA device controller, writing data to the appropriate register activates hardwired logic that causes automatic direct memory access (DMA) data transfer activity between SDRAM memory and the attached external I/O device.

In a DMA I/O interface, one of memory transfer engines 128 causes and controls the DMA data transfer through the DMA I/O interface. The result is the same as in the case of the DMA data transfer through a hardwired DMA device controller, as seen from UMS. The DMA I/O interface may signal completion to an assigned processing element 124 that started the DMA transfer, or the DMA transfer may continue indefinitely as in the case of a graphics controller. DMA I/O interfaces have performance characteristics similar to their hardwired equivalents. This is because memory transfer engines 128 are the I/O cluster fast (320 MIPs) and Pin State Machines 350 can handle I/O clock rates to 150 MHz or faster. This allows Pin State Machine 350 and memory transfer engine 128, in combination, to handle DMA I/O transfers at 400 MB/sec for a fast implementation. DMA I/O interfaces use virtual registers to control the I/O activity. DMA I/O interface can be activated by writing commands and parameters to the virtual registers. These virtual registers can be implemented in cluster memory 132 or in the register file of memory transfer engine 128. Memory transfer engine 128 transfers data through Pin State Machine 350 to or from I/O pins 162 of the DMA I/O interface. Memory transfer engine 128 completes the command by sending an interrupt to processing element 124.

For a DMA I/O interface, an assigned memory transfer engine 128 and a Pin State Machine 350 contain the firmware that implements the DMA I/O interface. Control and data flow in the DMA I/O interface is organized into three layers: Transaction, Device, and Physical.

Figure 4:
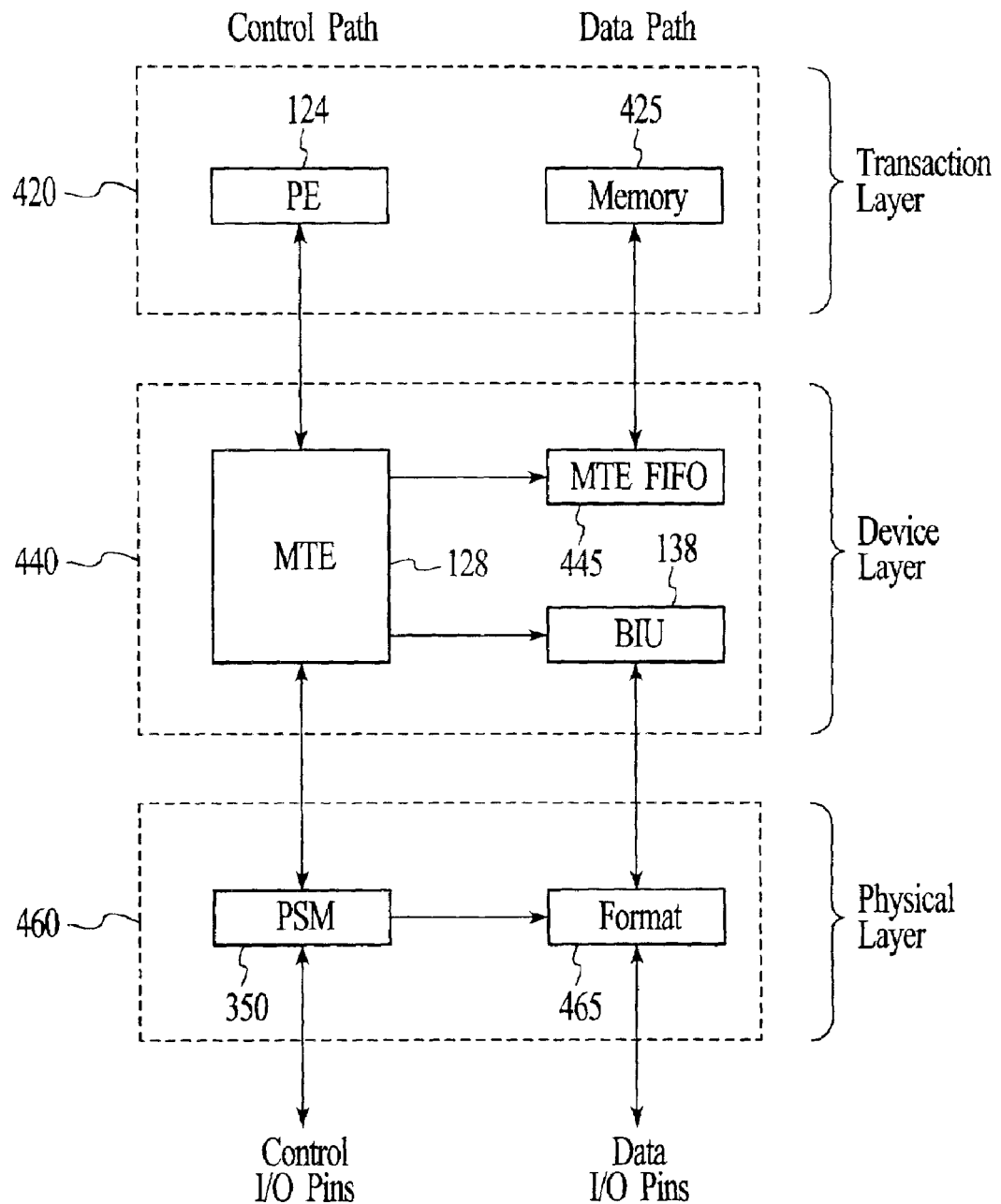
FIG. 4 is a diagram showing control and data flows in the programmable I/O system of FIG. 1.

With reference to FIG. 4, a Transaction layer 420 defines the data transfer to be performed including any special parameters for the transfer. It also defines the address in memory for the data. It issues transfer requests to a Device layer 440 to implement the transfer and receives completion responses from that layer. Transaction layer 420 defines the data transfer between memory 425 and data FIFO buffer 445. When the transaction is complete, transaction layer 420 issues a completion response to the original calling device. Code in processing element 124, seen in FIG. 1, implements Transaction layer 420.

Device layer 440 receives transfer requests from Transaction layer 420 and converts these into data packet transfers. It issues word and word group transfer requests to a Physical layer 460 to implement the packet transfers and receives completion responses from that layer. Device layer 440 controls the data transfer between memory 425 and data FIFO buffer 445. When Device layer 440 tasks are complete, it sends completion responses to Transaction layer 420. Code in an assigned memory transfer engine 128 implements Device layer 440.

Physical layer 460 receives word and group transfer requests from Device layer 440. It transfers a word at a time and controls the timing and handshaking interaction for each word. It can transfer a group of words in the same way, if so programmed. When Physical layer 460 tasks are complete, it sends completion responses to Device layer 460. Pin State Machine 350 implements Physical layer 460. The format block 465 sets up the pin direction as input or output, manages the electrical configuration (active low or high polarity, open drain or push-pull, etc.), and converts the data to or from the pins into respectively serial or parallel form.

Programming Method

Reprogrammable I/O system 100 can be programmed using the following design steps. The first step is to define the I/O interfaces to be implemented by sorting the interfaces into low speed programmed I/O interfaces and high speed DMA I/O interfaces. The next step is to implement the high speed DMA I/O interfaces first. For each DMA I/O interface, identify the signals required for each interface and then sort the signals into low speed and high speed types. Low speed preferably means low frequency, and high speed preferably means high frequency. A high speed DMA I/O interface often has several low speed signals (like MDC MDIO signals in the 802 ethernet protocol, etc.) which will be serviced by General Purpose Programmed I/O (GPIO) pins. The next task is to sort the high speed signals of the DMA I/O interface into control, address, and data signals, and then allocate the control signals to an I/O pin group 160. The Pin State Machine 350 for this pin group will control the address and data signals for the DMA interface. The next task is to allocate the address and data signals of the DMA I/O interface to adjacent pin groups 160. The pin groups used for the control, address, and data signals of the DMA I/O interface must be contiguous. Next, we allocate an MTE 128 to the DMA I/O interface, and then allocate the low speed DMA signals as GPIO pins.

For each low speed PIO interface, the first step is to identify the signals required for each interface, and then allocate these signals to unused I/O pins on the remaining pin groups 160. Any unused pin is available as a GPIO pin. Next is to allocate a PE 124 (there may be many PE 124 in I/O cluster 120) to the PIO interface.

Finally, allocate any remaining low speed signals that are not part of any interface to unused pins on the remaining pin groups 160. For examples, Buttons and LEDs that are not part of a specific I/O interface are of low speed type and should be allocated to unused pins on the remaining pin groups 160. High speed DMA pins must be assigned first because they must be allocated to a contiguous set of pin groups 160 (FIG. 1), beginning with the control pin group containing the PSM 350 for the DMA I/O interface. Low speed signals are assigned last because they can use any pin without restriction. Also, low speed signals have few restrictions on pin placement on printed circuit boards because they generate little noise and are not as sensitive to noise as compared to high speed DMA signals.

DMA I/O Interface Pin Allocation

DMA I/O interface consists of a contiguous set of pin groups with an assigned Pin State Machine 350 and memory transfer engine 128. DMA pin group allocation begins with the control signals, which are assigned to the first pin group allocated. The control signal pin group contains the Pin State Machine for the DMA I/O interface. Address and data signals of the DMA I/O interface are assigned to the next pin groups in sequence. Pin State Machine 350 will control these groups. Its control signals chain to the right (from low numbered pin groups to high numbered pin groups), which is why the data and address signals must be adjacent to the Pin State Machine 350 pin group. If pin group 7 is assigned to the control signals, pin groups 8 through 10 may be assigned to address signals and groups 11 and 12 assigned to data signals in a typical DMA I/O interface. Data signals must be allocated to a set of contiguous pins, and address signals must also be assigned their own set of contiguous pins.

Pin Allocation Rules

The following are the rules for pin allocation. In the following list of rules, the order from left to right corresponds to low order number to high order number, whether for pin groups or bits. For example, in the series 0 to 31, 0 is of low order, 31 is of high order, and 0 is to the left of 1, etc.

A pin is assigned as GPIO, control, data, address or write enable pin. Write enable pins are a special case of data pins. There are no restrictions on GPIO pin assignments. Any I/O pin can be a GPIO pin. Each pin group has only one Pin State Machine, and the Pin State Machine is assigned to only one DMA I/O interface. This is because a pin group has only one Pin State Machine for control and one FIFO for address or data. Control pins must be assigned first, then write enable pins (if any), data pins, and address pins, if any, are assigned. Control pins must be the left-most of the pins for the DMA I/O interface. Allocation of one or more pin groups for each pin type (control, data, address) should be done if possible. Unused pins are assigned as GPIO pins because GPIO pins can be placed anywhere. Data pins must be a contiguous group, and address pins must be a contiguous group. The address pins can be assigned before the data pins, if desired.

Pin Group Sharing Rules

Mixing pin types in a pin group is allowed to make use of the unused pins. By mixing types, the number of pin groups used per DMA device is reduced. The following rules apply for sharing pin types in a pin group. It is allowed to mix GPIO and control pins in any order. The control pins should be implemented in one pin group in order not to have to chain Pin State Machine (PSM) 350. A pin group can have a mix of GPIO pins with control pins but not with address or data pins. A pin group can have both control and write enable, control and data, or control and address pins. A pin group cannot have both address and data pins. Control pins must be in single group or adjacent groups with state propagation. Byte enable pins must start with bit 0, corresponding to the byte write enable for byte 0. Byte enable pins must be a contiguous group. No interspersed pins of GPIO or other types. Byte enable pins do not have to be contiguous with the data pins. It is allowed to have GPIO and control pins between the write enable pins and the data or address pins. Data pins can start and stop at any pin in a pin group unless they are used for serial data. Data pins must be a contiguous group. No interspersed pins of GPIO or other types are allowed. If data pins are for 1, 2 or 4-bit data, they must start at bit position 0 of the pin group. It is allowed to have GPIO pins between the data pins and the address pins. Address pins can start and stop at any bit position in a pin group, unless they use an increment function. Address pins must be a contiguous group. No interspersed pins of GPIO or other types are allowed. If address pins use an address increment function, they must start at bit position 0 of the pin group.

Figure 5:
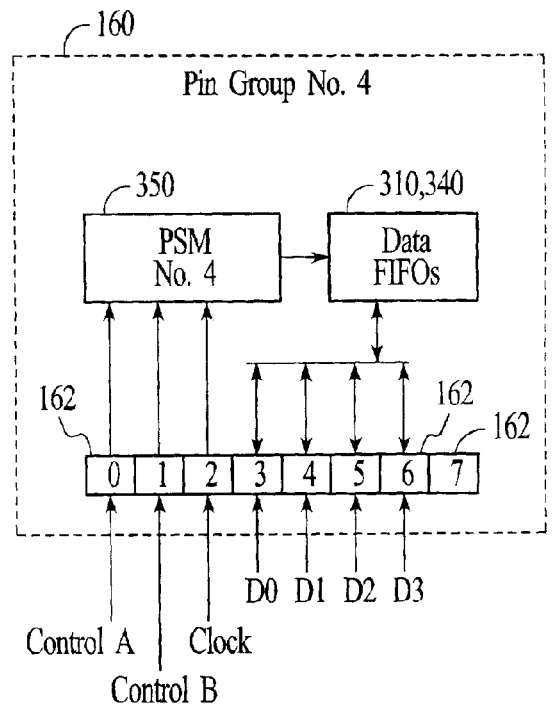
FIG. 5 is an electrical schematic diagram of a seven-pin DMA interface using one pin group of the system of FIG. 1.

With reference to FIG. 5, a 4-bit serial DMA I/O interface may require only four pins for data signals, two pins for control signals, and one pin for a clock signal. This DMA I/O interface can be mapped onto a single pin group, with the first three pins used for control signals and the next four pins for data. Control and data or address signals can share a pin group.

Figure 6:
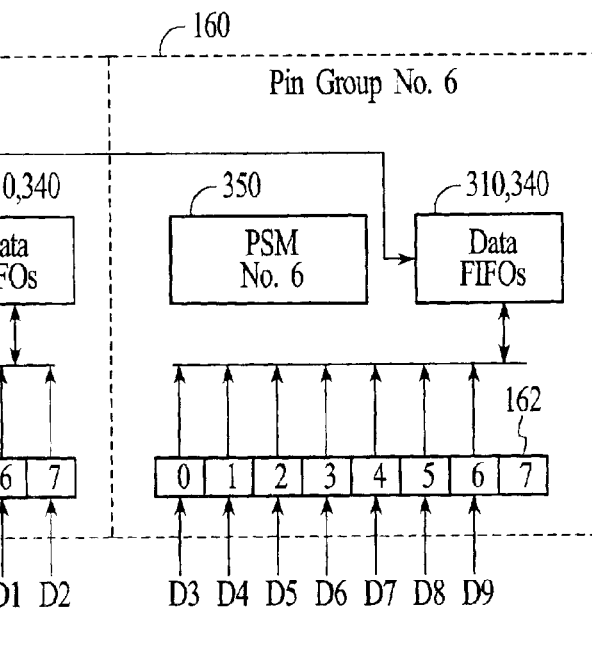
FIG. 6 is an electrical schematic diagram of a thirteen-pin DMA interface using two pin groups of the system of FIG. 1.

With reference to FIG. 6, a 10-bit CCD interface might have three control signals and ten data signals. The three control signals would be assigned to three of the first five pins of Pin Group No. 5. The first three data signals (D0–D2) are assigned to the last three pins of Pin Group No. 5, and the last seven data signals (D3–D9) are assigned to the first seven pins of the next adjacent pin group (Pin Group No. 6). Here, the control pins are not contiguous, but the data pins are. The data pins are considered contiguous when the two Pin Groups Nos. 5 and 6 are seen as a set of sixteen pins. PSM No. 6 will probably not be used because it has only one control pin left to it (Pin 7 of Pin Group No. 6).

Figure 7:
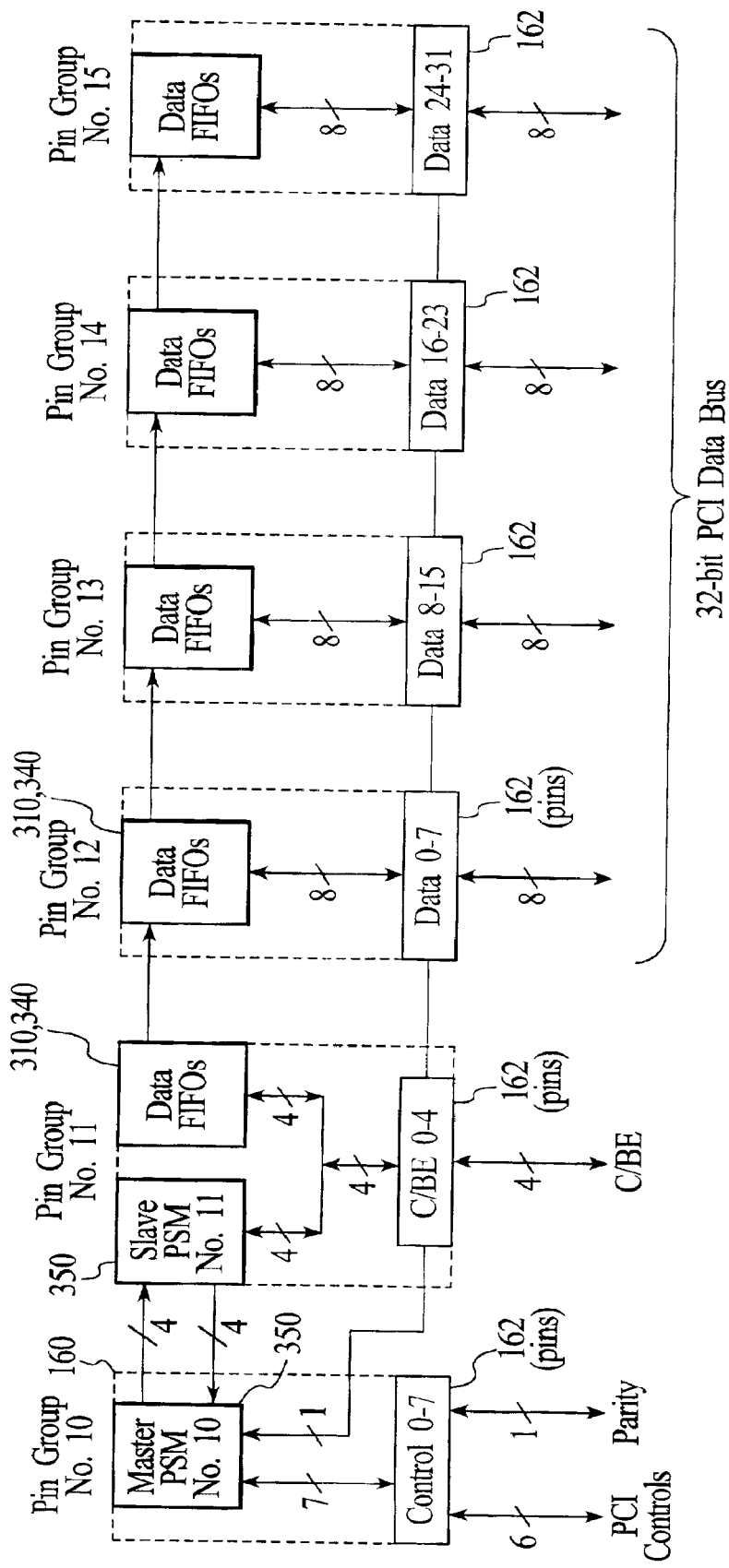
FIG. 7 is an electrical schematic diagram of a PCI interface using six pin groups of the system of FIG. 1.

With reference to FIG. 7, a PCI interface requires eleven pins for eleven control signals. The PCI interface uses seven signals FRAME, IRDY, TRDY, IDSEL, DEVSEL, PARITY, and STOP for primary control and uses four signals C/BE (control/byte enable) for function select during frame time. The C/BE pins are unique in that they are both control and write enable data pins. They are control pins during frame time. They are driven by the initiator device and read by the target device during frame time. At all other times, they are byte enables for the data being transferred on the bus, and are thus associated with the data being transferred. Two PSMs Nos. 10 and 11 are used to control these eleven pins. Master PSM No. 10 provides the master control, and it controls Slave PSM No. 11. The PSM's of pin groups Nos. 12, 13, 14, and 15 are not used and therefore are not shown in FIG. 7. The state bits from Master PSM No. 10 are fed to Slave PSM No. 11 rather than the state bits that would normally be generated by Slave PSM No. 11. The PLD of Slave PSM No. 11 becomes an extension of the PLD of PSM No. 10. This allows Master PSM No. 10 to use Slave PSM No. 11 to generate the C/BE bits as outputs during frame time when the DMA device is a PCI initiator. Slave PSM No. 11 also generates four chain signals back to Master PSM No. 10 so that the C/BE signals input to Slave PSM No. 11 can be sent to Master PSM No. 10 and used by it during frame time when its DMA device is a target. The PLD of Slave PSM No. 11 further conditions the C/BE signals. The PLDs of PSMs Nos. 12 through 15 are configured as address comparators for the incoming address on the bus during frame time. These signals are reverse daisy chained (i.e., from the higher numbered pin groups to the lower number) so that a 32-bit detector is formed from the four PSM PLDs. PSM No. 11 receives the address comparison signal and uses it to condition the C/BE signals passed to PSM No. 10.

With reference to FIG. 9, except for the first pin group 160a and last pin group 160n, each pin group 160 has chain connections with its two neighbors. Specifically, PSM 350b of pin group 160b has a chain connection 810a with the PSM 350a of pin group 160a and a chain connection 810b with the PSM 350c of pin group 160c. Similarly, the Data FIFO of pin group 160b has a chain connection 820a with the Data FIFO of pin group 160a and a chain connection 820b with the Data FIFO of pin group 160c. Within a in group 160, PSM 350 and Data FIFO are connected via a connection 850. PSM's use chain connections 810 to establish master-slave relationship when the number of control signals of the interface to be implemented requires the use of more than one PSM, as in the PCI bus interface of FIG. 7.

With reference to FIG. 9, reprogrammable I/O system 100 is programmed to implement I/O interfaces needed by a digital camcorder. Thirty two I/O pin groups 160 are used to implement seven I/O interfaces to seven external I/O devices listed in column three of the table.

What is claimed is:

1. A method of implementing a plurality of interfaces between a chip or board and external devices or buses, said method comprising the steps of:
   (a) providing in said chip or board a reprogrammable I/O system having a plurality of reprogrammable pin groups of I/O pins for implementing said plurality of interfaces, each of said reprogrammable pin groups having a pin state machine and a data FIFO coupled together, each of said pin state machines having first chain connections to two neighbor pin state machines, each of said data FIFOs having second chain connections to two neighbor data FIFOs, said interfaces including high speed interfaces and low speed interfaces, each of said high speed interfaces having high speed signals and low speed signals, said high speed signals including control signals, address signals, and data signals, each of said low speed interfaces having only low speed signals;
   (b) for each of said high speed interfaces, assigning said control signals of said high speed interface to the I/O pins of a first pin group,
   if there are unassigned control signals of said high speed interface due to the number of said control signals exceeding the number of I/O pins in said first pin group, assigning said unassigned control signals to the I/O pins of a second pin group;
   assigning said address signals and data signals of said high speed interface to a third pin group;
   assigning said low speed signals of said high speed interface to the unassigned I/O pins of said first, second, and third pin groups;
   assigning a first pin state machine of said first pin group to said high speed interface, said pin state machine directly controlling the transmission of said address and data signals of said high speed interface;
   assigning a second pin state machine of said second pin group to said high speed interface and using said first chain connections between said first and second pin state machines to establish a master-slave relationship between them, said first and second pin state machines together controlling the transmission of said address and data signals of said high speed interface; and
   (c) for each of said low speed interfaces, assigning said low speed signals of said low speed interface to the remaining unassigned I/O pins of said plurality of reprogrammable pin groups.

2. The method of claim 1 wherein said assigning said control signals and assigning said address signals and data signals comprise selecting contiguous pin groups for said first, second, and third pin groups.

3. The method of claim 2 wherein said assigning said control signals and assigning said address signals and data signals comprise selecting said second pin group to the right of said first pin group and selecting said third pin group to the right of said second pin group.

4. The method of claim 3 wherein said assigning said control signals comprises:
   assigning said control signals to the leftmost contiguous I/O pins of said first pin group; and
   in said first situation, assigning said unassigned control signals to the leftmost contiguous I/O pins of said second pin group.

5. The method of claim 4 further comprising, for each of said high speed interfaces, the steps of:
   providing at least a memory transfer engine coupled to said plurality of reprogrammable pin groups; and
   using said memory transfer engine to create a virtual I/O interface controller for said high speed interface.

6. The method of claim 5 wherein, for each of said low speed interfaces, said assigning said low speed signals of said low speed interface comprises assigning said low speed signals of said low speed interface to the remaining unassigned I/O pins of said first, second, and third pin groups.

7. A method of implementing a plurality of interfaces between a chip or board and external devices or buses, said method comprising the steps of:
   (a) providing in said chip or board a reprogrammable I/O system having a plurality of reprogrammable pin groups of I/O pins for implementing said plurality of interfaces, said I/O pins being arranged conceptually in a row, each of said reprogrammable pin groups including a pin state machine and a data FIFO coupled together, each of said pin state machines having first chain connections to two neighbor pin state machines, each of said data FIFOs having second chain connections to two neighbor data FIFOs, said interfaces including high speed interfaces and low speed interfaces, each of said high speed interfaces having high speed signals and low speed signals, said high speed signals including control signals and other high speed signals, each of said low speed interfaces having only low speed signals;
   (b) for each of said high speed interfaces, assigning said control signals of said high speed interface to a first plurality of I/O pins in said row;
   assigning said other high speed signals to a second plurality of I/O pins in said row, said second plurality of I/O pins being to the right of said first plurality of I/O pins in said row;
   assigning first pin state machines to said high speed interface, said first pin state machines corresponding to first pin groups of said plurality of reprogrammable pin groups, each of said first pin groups having at least one I/O pin being assigned to one of said control signals;
   said first pin state machines communicating with one other via said first chain connections thereby controlling data transmission through said high speed interface; and
   (c) for each of said low speed interfaces, assigning said low speed signals of said low speed interface to the remaining unassigned I/O pins in said row.

8. The method of claim 7 wherein said assigning said control signals of said high speed interface to a first plurality of I/O pins in said row comprises:
   assigning said control signals to the I/O pins of a second pin group; and
   in a first situation where there are unassigned control signals of said control signals due to the number of said control signals exceeding the number of I/O pins in said second pin group, assigning said unassigned control signals to a third pin group being next to the right of said second pin group.

9. The method of claim 8 wherein said assigning said other high speed signals comprises assigning address signals and data signals.

10. The method of claim 9 wherein said assigning said address signals comprises assigning said address signals to contiguous pins.

11. The method of claim 10 wherein said assigning said data signals comprises assigning said data signals to contiguous pins.

12. The method of claim 9 wherein said assigning first pin state machines to said high speed interface comprises assigning said first pin state machines of contiguous pin groups.

13. A reprogrammable I/O system for implementing a plurality of interfaces comprising:

a plurality of reprogrammable pin groups of I/O pins programmed so as to implement said plurality of interfaces, said plurality of reprogrammable pin groups being arranged logically in a row, each of said reprogrammable pin groups including a pin state machine and a data FIFO coupled together, said pin state machine of said pin group having first chain connections to two neighbor pin state machines and having connections to the I/O pins of said pin group, said data FIFO of said pin group having second chain connections to two neighbor data FIFO's and having connections to the I/O pins of said pin group, wherein said pin state machines control data transmission between said data FIFO's and said I/O pins.

14. The I/O system of claim 13 further comprising a memory transfer engine coupled to said plurality of reprogrammable pin groups, said memory transfer engine working with said pin state machines to implement said plurality of interfaces.

15. The I/O system of claim 14 wherein said memory transfer engine and said pin state machines contain firmware for controlling data transmission between said data FIFO's and said I/O pins.

16. The I/O system of claim 15 wherein a first set of pin groups of said plurality of reprogrammable pin groups implement a high speed interface of said plurality of interfaces, said high speed interface has a plurality of high speed signals and low speed signals, said high speed signals include control signals, address signals, and data signals, a first pin group of said first set of pin groups implementing said control signals, each control signal of said control signals is assigned to one I/O pin of said first pin group.

17. The I/O system of claim 16 wherein in a first situation where there are unassigned control signals of said high speed interface due to the number of said control signals exceeding the number of I/O pins of said first pin group, a second pin group of said first set of pin groups implements said unassigned control signals.

18. The I/O system of claim 17 wherein said second pin group is next to the right of said first pin group.

19. The I/O system of claim 14 wherein a first set of pin groups of said plurality of reprogrammable pin groups implement a high speed interface of said plurality of interfaces, said high speed interface has a plurality of high speed signals and low speed signals, said high speed signals include control signals, address signals, and data signals, a first pin group of said first set of pin groups implementing said control signals, each control signal of said control signals is assigned to one I/O pin of said first pin group.

20. The I/O system of claim 13 wherein a first set of pin groups of said plurality of reprogrammable pin groups implement a high speed interface of said plurality of interfaces, said high speed interface has a plurality of high speed signals and low speed signals, said high speed signals include control signals, address signals, and data signals, a first pin group of said first set of pin groups implementing said control signals, each control signal of said control signals is assigned to one I/O pin of said first pin group.

* * * * *